United States Patent [19]

LeMire

[11] 4,121,206
[45] Oct. 17, 1978

[54] FIBER OPTIC MESSAGE CHARACTER DISPLAY DEVICE AND METHOD OF MAKING SAME

[75] Inventor: Paul R. LeMire, Yonkers, N.Y.

[73] Assignee: Ackerman Bodnar Corporation, New Rochelle, N.Y.

[21] Appl. No.: 759,472

[22] Filed: Jan. 14, 1977

[51] Int. Cl.² .......................... G02B 5/16; G08B 5/00
[52] U.S. Cl. .................................. 340/380; 340/381; 361/414
[58] Field of Search ............... 340/380, 381; 361/414; 29/592; 156/296; 350/96 B

[56] References Cited

U.S. PATENT DOCUMENTS

| | | | |
|---|---|---|---|
| 3,522,474 | 8/1970 | Piel | 361/414 |
| 3,600,058 | 8/1971 | Kato | 340/380 X |
| 3,803,597 | 4/1974 | Kirner | 340/380 X |
| 3,819,442 | 6/1974 | Brushenko | 156/296 |
| 3,875,479 | 4/1975 | Jaggar | 361/414 |
| 3,887,803 | 6/1975 | Savage | 340/381 X |
| 3,916,514 | 11/1975 | Salminen | 361/414 |
| 3,960,629 | 6/1976 | Goldsworthy | 156/296 |

*Primary Examiner*—Harold I. Pitts
*Attorney, Agent, or Firm*—Pennie & Edmonds

[57] ABSTRACT

A light-emitting message character display device suitable for use in high ambient light levels such as are encountered in aircraft cockpits at high altitudes utilizes optic fiber light guides for converting one or more primary light sources into corresponding illuminated message characters emanating from the output ends of the light guides. The device includes (1) a light guide support member having a light receiving surface with a plurality of openings and a visual message character display surface with corresponding openings arranged to provide arrays of a plurality of bar segments of predetermined visual message characters; and (2) a plurality of groups of light guiding optic fibers disposed between and supported by the light receiving and message character display surfaces of the light guide support member. The light admitting ends of each group of optic fibers are bundled together in closest packing configuration into one opening of the light receiving surface and the light emitting output ends of each group of optic fibers are bundled together in closest packing configuration into one opening of the visual message character display surface and define and occupy essentially the entire area of a visual message character bar segment. Sub-miniature incandescent lamps which can be used as the primary light sources for the message character display device are provided with unequal-length terminal pins to permit each pin to be inserted into and contacted with separate printed circuit boards utilizing conventional lead sockets.

5 Claims, 6 Drawing Figures

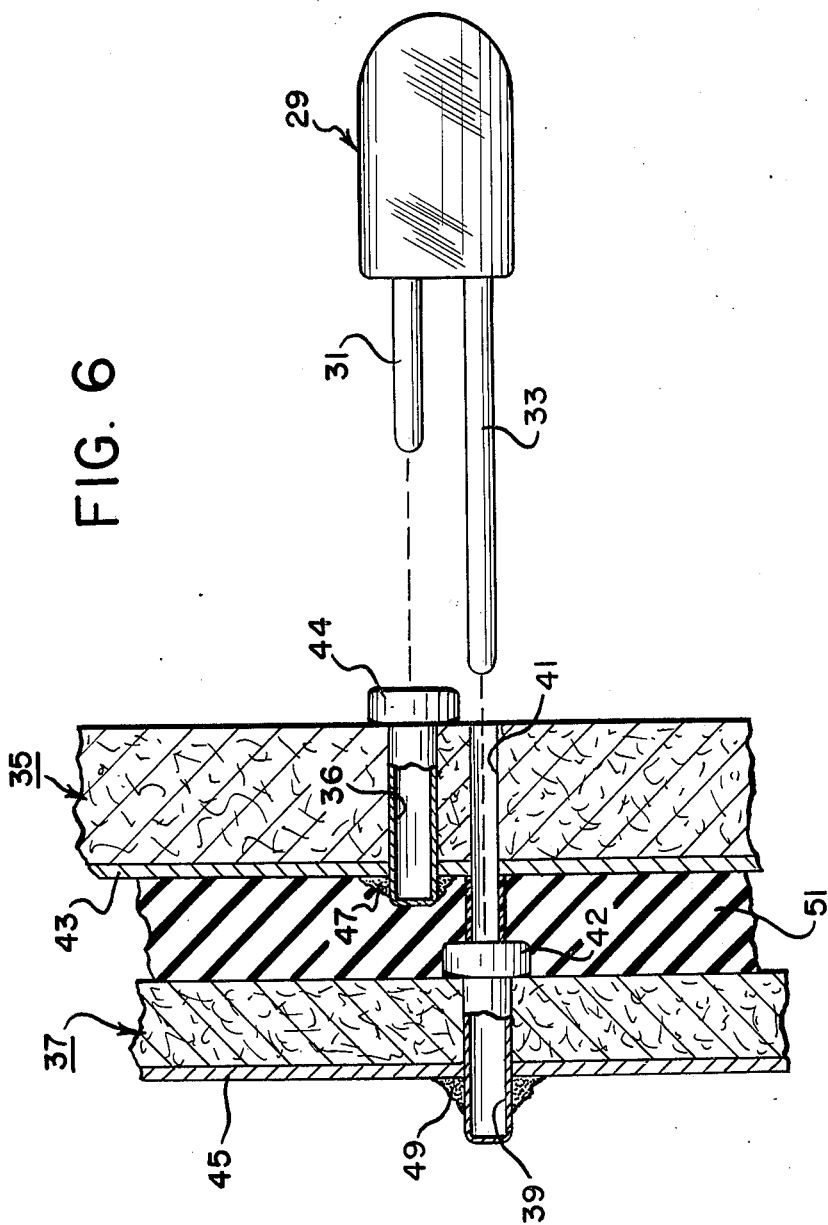

FIBER OPTIC MESSAGE CHARACTER DISPLAY DEVICE AND METHOD OF MAKING SAME

BACKGROUND OF THE INVENTION

This invention relates to means for visually displaying message characters or symbols which are derived from coded information in the form of "on/off" states of a plurality of primary light sources. More particularly, the invention relates to a device or apparatus which utilizes a plurality of groups of light guiding optic fibers whereby light from one or more of a plurality of individual corresponding primary light sources is converted into meaningful message character-shaped arrays.

The use of light guiding "pipes" or optic fibers for communicating or conveying information from one point to another is known in the art and is disclosed, for example, in U.S. Pat. Nos. 3,043,179 and 3,109,065. Procedures have also been developed for assembling optic fiber bundles for use in specific applications, such as gastroscopes, endoscopes and vacuum tube faceplates as described in U.S. Pat. No. 3,215,029 and illuminated numerical display devices as described in U.S. Pat. No. 3,379,890.

Present standard industry practice for forming illuminated letter and/or numerical message character displays utilizes seven ("numeric") or sixteen ("alphanumeric") bar-shaped segments not visible in an "off" condition but which become visible in an "on" condition by emitting light. Each "bar" segment is energized and illuminated independently or in combination with other segments to form a meaningful symbolic display. Present techniques, involving the use of light guiding optic fibers, as exemplified by U.S. Pat. No. 3,420,949, are restrictive in the number of light-guides used per bar-segment. Usually, an array of three light guides displaying three individual dots forms a single bar-segment, that is, one bar-segment is visually displayed by a series of three dots equally spaced apart from one another.

However, the foregoing practice of using arrays of separate "dots" to construct message character bar segments in a symbolic display device has prevented such devices from achieving total acceptability in situations where the amount of ambient light is great enough to diminish resolution and the degree of contrast between the illuminated "dots" and the dark-field background surrounding them to the point where legibility is seriously impaired. A need has therefore existed, particularly in avionic and outdoor applications, for visual message character display devices having greatly enhanced resolution and luminous intensity as compared with devices heretofore available.

Accordingly, it is an object of the present invention to provide visual message character display devices which give effective read-outs in environments having high ambient light levels.

Another object is to provide visual message character display devices for use in applications requiring low maintenance and easy replacement of parts.

Another object is to provide visible message character display devices of a design which facilitates low cost, rapid mass production thereof.

Yet another object is to provide a method for producing rapidly and at low cost visual message character display devices which give effective read-outs in environments having high ambient light levels and which require low maintenance and easy replacement of parts.

These and other objects of the present invention as well as a fuller understanding of the advantages thereof can be had by reference to the following detailed description, drawings and claims.

SUMMARY OF THE INVENTION

The foregoing objects are achieved according to the present invention by a visual message character display apparatus in which meaningful message characters or symbols of high resolution and luminosity are formed at the ends of groups of light guiding optic fibers assembled within a support member in the manner herein described. The message characters are derived from coded information in the form of "on/off" states of a plurality of primary light sources which are converted into character-shaped arrays by means of the bundles of light guides.

In the message character display device of the present invention the light guide support member has a light receiving surface with a plurality of openings, preferably substantially circular in shape, to permit the passage of light through the receiving surface, and a visual message character display surface which is separate and spaced apart from the light receiving surface. The display surface also has a plurality of openings to permit the passage of light, but these are shaped and arranged to provide arrays of a plurality of bar segments of predetermined visual message characters.

The groups of light guiding optic fibers are disposed within the support member between the light receiving and message character display surfaces. Each light guiding optic fiber can be considered as having a light admitting input end and a light emitting output end. The light admitting ends of the fibers of each group of light guiding optic fibers are bundled together in one opening in the light receiving surface and terminate there; furthermore, the light-admitting ends of the fibers are bundled in such a way that they define and occupy essentially the entire surface area of the opening to ensure maximum capture of light incident on the opening. The light emitting ends of the fibers of each group of light guiding optic fibers are similarly bundled together in one opening in the message character display surfaces and terminate there; in this manner the light emitting ends of the fibers likewise together define and occupy essentially the entire surface area of a visual message character bar segment.

The present invention achieves its objects, therefore, by means of a luminous message character read-out device in which each message character bar segment comprises as many light guides of the smallest practical cross-section (e.g., 0.010 inch diameter) as may be fitted into the area determined by the size of the bar-segment. The sum of the cross sectional areas of the light guides thus approaches or equals the area of the bar-segment. The result is that the total flux of light emitted over the area of each bar-segment is much greater than that of a three- or multi-dot pattern segment of the same size, thus giving much greater visiability (luminous intensity) of emitted light and better definition of the shape (resolution) of the bar segment. Accordingly, the fiber optic read-out device of the present invention meets or exceeds approved standards of legibility and optimum brightness for avionic displays and other control panel designs used in extremes of ambient light conditions.

The term "light guiding optic fibers" as used herein is understood to means optically clear plastic or glass fibers which have been developed in recent years for use in fiber optic applications. Optic fiber light guides suitable for use in the present invention are elongated, relatively fine light-conducting flexible filaments or fibers, preferably of uniform circular cross-section, each of which must be capable of readily and efficiently transferring light from one of its ends to the other. Such light guides generally embody a core portion of a relatively high refractive index glass such as, for example, an optical flint glass having an index of refraction of about 1.62 and relatively thin outer coating or cladding of a low refractive index glass or plastic such as, for example, an optical crown or soda-lime glass having an index of refraction of about 1.52. The core and cladding materials should have substantially the same coefficient of thermal expansion and softening and melting temperatures. Suitable optic fiber light guides can also be formed from combinations of other types of glasses of other light-conducing materials having the appropriate refractive indices. Also, uncoated fibers can be used to form the message character display device of the present invention. Generally, however, coated or clad fibers are preferred because the low refractive index outer cladding will serve to optically insulate the fibers, thereby ensuring total internal reflection of all light passing therethrough and consequent optimum transmission effeciency.

Closely related to the configuration of the light admitting and emitting ends of the groups of optic fibers at the respective openings in the light receiving and character display surfaces according to the present invention is the feature whereby individual optic fiber light guides are formed into bundles of a predetermined shape on both ends by means of heat-fusion involving the use of molds which compress the ends of the light-guiding optic fiber bundles into any desired overall shape, e.g., to form a bar segment of a message character. The compression of the bundle-end under heat allows a nearly 100% "fill" of the desired shape, thereby eliminating the voids between adjacent fiber ends without damaging the optical transmission properties of the fiber. Preferably, and as described in detail below, the compressed ends of the fiber bundle result in a "honeycomb" or hexagonal ("closest") packing configuration of the fiber ends.

Another feature of the invention is to mold or cast a potting or embedding or resin compound preferably of the thermosetting type, into the space between the light receiving and message character display surfaces of the light guide support member whereby the pre-formed light-guide bundles are secured into a unitary, solid "light block", the bundle ends exiting at opposite faces of the block to form a meaningful message character. Materials suitable for this purpose are referred to herein as potting compounds and are well known in the art and are described, for example, in Kirk-Othmar, *Encyclopedia of Chemical Technology*, 2nd ed., vol. 6, pp. 102–116 (1965). As a result, one face of the block becomes the light-accepting or receiving surface (containing the light admitting ends of the optic fiber bundles), the other face being the light-emitting or character display surface. The read-out device thus constructed permits modular or building block assembly configuration with attendant advantages in mass production of the device which possesses unusual mechanical strength, resistance to shock and vibration, and imperviousness to heat, moisture and corrosive agents (e.g., salt spray).

In a further aspect of this invention there is provided an improved means for mounting the individual lamp (primary light source) for each message character bar segment behind the light receiving surface of the lightblock. Present industry practice is to employ sub-miniature incandescent lamps having two straight pin terminals exiting at the base of the lamp, spaced 0.050 inch between centers and to insert them into one printed circuit board with matching receptacles for the lamppins. These receptacles are usually tubular rivets matching the diameter of the lamp pins. The improved lamp mounting method of this invention utilizes a double printed circuit board wherein each board has a contact spring-loaded receptacle providing much greater contact reliability due to the spring contact exerting pressure against the lamp-pin. These spring-contact receptacles, available as an off-the-shelf item from industrial suppliers, cannot ordinarily be mounted adjacently on 0.050-inch centers due to the size of their mounting grommets. The use of two superimposed printed circuit boards in the manner of the invention, however, allows maintaining of 0.050-inch centers as described hereinbelow.

DESCRIPTION OF THE DRAWINGS

Further details of the present invention and its preferred embodiments can be had by reference to the accompanying drawings wherein:

FIG. 6 is a cross-sectional view illustrating the improved method for mounting the individual lamps which serve as the primary light sources for the optic fiber bundles.

Figures 1, 2:
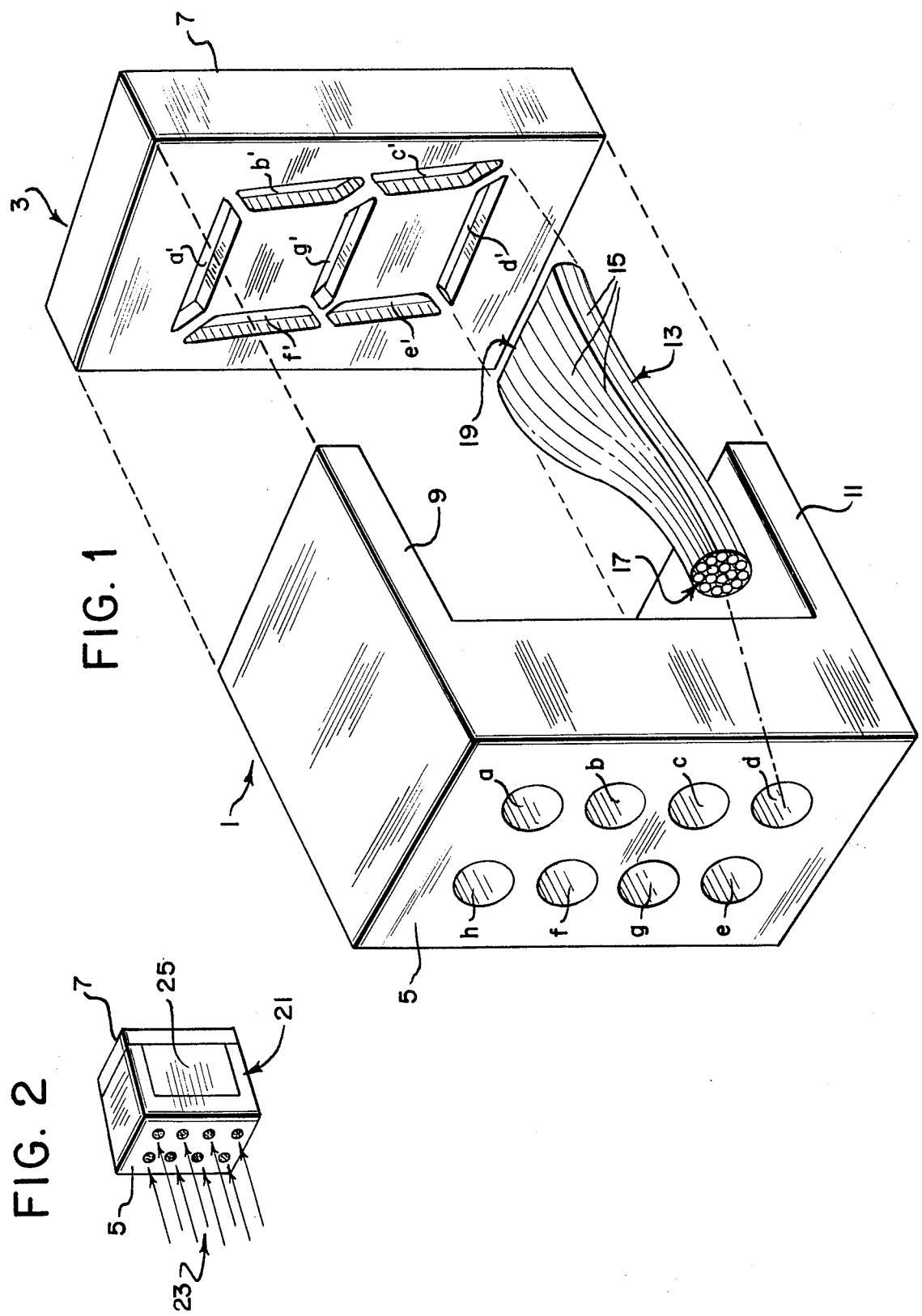
FIG. 1 is an exploded perspective view of a message character display device according to the present invention.
FIG. 2 is a perspective view of a message character display device of the invention in modular building-block form wherein the space between the light receiving and message character display surfaces has been filled with a potting compound.

With particular reference to FIG. 1, segments 1 and 3, when assembled in mutually abutting relationship according to the dotted lines shown, constitute the rigid light guide support member, of which face 5 is the light receiving surface and face 7 (not shown) is the visual message character display surface, the light receiving and message character display surfaces being separated and spaced apart in parallel relationship to one another by the portions 9 and 11 of the support member. As shown, light receiving surface 5 possesses a plurality of preferably (but not necessarily) circular openings, *a, b, c, d, e, f,* and *g* which are designed to communicate through optic fiber bundles in a one-to-one relationship with correspondingly lettered message character bar segment-shaped openings a', b', c', d', e', f and g' located in the visual message character display surface 7. Opening h in light receiving surface 5 is optional, and may or may not communicate with a corresponding opening in character display surface 7. A shown, a bundle or group 13 of a plurality of light guiding optic fibers 15 is disposed within the space between light receiving surface 5 and character display surface 7 and serves to transmit light from opening d to bar-shaped opening d'. Similarly, each of the other pairs of corresponding openings aa', bb', etc. has associated with it a bundle or group of light guiding optic fibers disposed between the light receiving and character display surfaces. When assembled, the light admitting ends 17 of the fibers 15 of group 13 are bundled together in opening d in and terminate at the light receiving surface 5 and thereby define and occupy essentially the entire surface area of the opening. Similarly, the light emitting ends 19 of the fibers of group 13 are bundled together in opening d' in and terminate at the character display surface 7 and thereby define and occupy essentially the entire surface area of the message character bar segment opening. Thus, by supplying light selectively and simultaneously to one or more of the openings in the light receiving surface 5, any desired combination of message character bar segment openings in character display surface 7 can be illuminated to create a meaningful message character or symbol. In the preferred case where optic fibers of uniform cross-section are employed, the area defined on the light receiving surface by the light-admitting ends of the fibers of each group of light guiding optic fibers is essentially equal to the area defined on the message character display surface by the light emitting ends of the fibers of said group.

Figure 3:
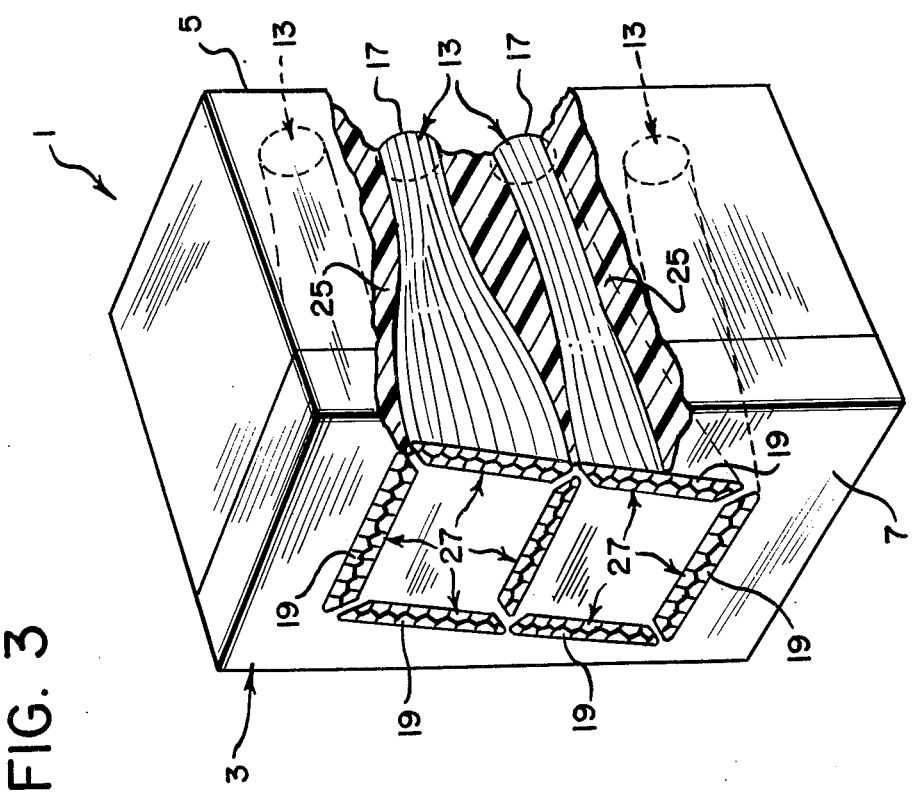
FIG. 3 is a partial cutaway view of the device depicted in FIG. 2 showing the manner in which the bundles of optic fibers are securely embedded within the molded potting compound.

In cases where it is desired to impart exceptional mechanical stability and shock and vibration resistance to the message character display device, a potting compound can be cast or molded into the space occupied by the groups of optic fibers between the light receiving and character display surfaces to produce a solid monolytic block. As shown in FIG. 2, such a block 21, of monolytic-type configuration which can be fabricated as one of a series of adjacent, detachable modular units for large scale, rapid production, permits the passage of light 23 (derived from primary light sources) incident on the light receiving surface 5 through the light guiding optic fiber bundles (not shown) which are embedded in the potting compound-filled portion 25 of the device to the output ends of the bundles which terminate at the character display surface 7. This embodiment of the invention is depicted more graphically in FIG. 3 which illustrates how the individual groups of optic fibers are firmly embedded in the monolytic block of the read-out device. FIG. 3 also shows how the light emitting ends of the optic fibers of a group 13 are bundled together into one message character bar segment opening 27 on character display surface 7. While the message character bar segment openings depicted in FIG. 3 are arranged to form a seven-sided "numeric" pattern, it is understood that a smaller or larger number of such openings may be arranged, for example, in a 16-sided "alpha numeric" pattern within the scope of the invention.

Figure 4:
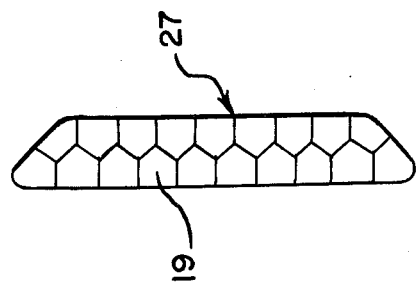
FIG. 4 is an enlarged frontal view of a message character bar segment of the device of the present invention showing the configuration of the bundled ends of the optic fibers whereby there is achieved a nearly 100 percent "fill" of the area defined by the bar segment.

FIG. 4 is an enlarged frontal view of opening 27 in character display surface 7 showing how the light-emitting ends 19 of the optic fibers achieve maximum "fill" of the area of the bar segment by virtue of the hexagonal cell-shaped ends of each fiber achieved by compression molding which permits a closest packing arrangement with minimum distortion of the fibers during the forming process. Similarly, the light admitting ends of the groups of fibers which are bundled into the openings on the light receiving surface achieve optimum "fill" of the area of each opening by virtue of the hexagonal-shaped ends of the fibers.

Figure 5:
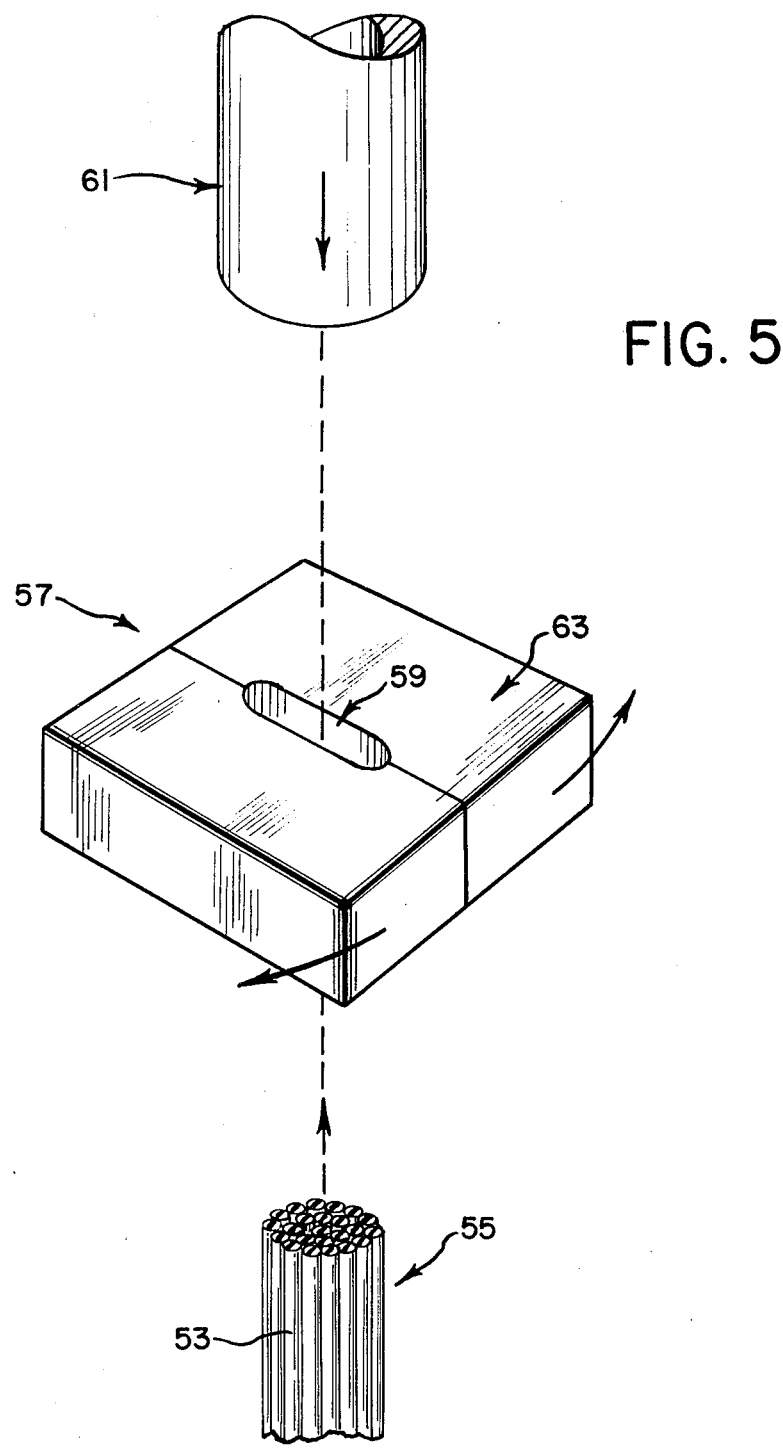
FIG. 5 is a perspective view of a preferred means for forming the ends of individual fiber light guides into bundles of a predetermined shape.

FIG. 5 is a perspective view illustrating a preferred means and method for forming the ends of individual fiber light guides into bundles of a predetermined shape through heat-fusion involving the use of a mold which compresses the ends of the light-guiding optic fiber bundles into any desired overall shape, e.g., to form a bar segment of a message character. Referring to FIG. 5, the desired number of light-guiding-optic fibers 53 that are intended to be used to make up a bar-segment are assembled into a multi-strand tow or bundle 55 and stored on an appropriate container (not shown). The fiber bundle 55 is then passed through a split-die set 57 containing the desired shape 59 to which the bundle is to be formed. The die 57 is opened in the manner indicated by the arrows, the bundle 55 is passed through, and the die is then closed. A controlled conductive or radiative source of heat, 61, is then brought in contact with the end of the fiber bundle and gradually moved toward the die set 57. Both the distance from the die set and the time of exposure of the fiber bundle to the heat are controlled so as to force the fibers held by the die into the die shape and to achieve a hexagonal, closest-packing configuration of the fiber ends. In practice the length of the fused portion of the fiber bundle is adjusted to achieve sufficient structural coherence among the fiber ends to permit subsequent installation of the fiber bundle into the appropriate openings in the read-out device. For optic fiber light guides in the neighborhood of 0.010 inch diameter, the fused portions of the fibers extend for distances of about 0.02 to 0.03 inch from the fiber ends. Flashing (melted fiber) is then sliced flush with the die face 63 and the formed fiber bundle is removed from the die. Both ends of the fiber bundle are treated in the same manner, after which the bundle is ready for installation in the light receiving and message character display surfaces of above-described read-out device.

FIG. 6 illustrates the improved method of the present invention for mounting the individual incandescent sub-miniature lamps which serve as the primary light sources for the groups of optic fibers in the message character read-out device. Referring to FIG. 6, incandescent lamp 29 is equipped with two terminal straight leads or pins 31 and 33 of unequal length which exit from the base of the lamps. Short lead 31 is inserted into and makes electrical contact with ground plane printed circuit board 35 by engagement with lead socket 36. Long lead 33 is inserted into and makes electrical contact with power plane printed circuit board 37 by engagement with lead socket 39 and in so doing passes through lamp pin guide hole 41 without making electrical contact with ground plane printed circuit board 35. Sockets 36 and 39 can be typical commercially available closed entry miniature lead sockets each having two or more gold-plated leaf spring contacts (not shown) and customarily fitted with mounting grommets 42 and 44. The sockets 36 and 39 are in electrical contact respectively with the copper-clad portions 43 and 45 of circuit boards 35 and 37 through solder contacts 47 and 49. The space between circuit boards 35 and 37 can be filled with molding compound or other electrically insulating material 51. By following this procedure, the sub-miniature incandescent lamps 29 can be used as primary light sources for the message character read-out device of the invention utilizing commercially available lead socket receptacles 35 and 37 having grommets 42 and 44, notwithstanding the small distance (e.g., 0.050 inch) between the axes of the terminal straight pins 31 and 33. In using the arrangement shown in FIG. 6, lamp 29, when mounted on circuit board 35 and 37, is disposed behind the light receiving surface of the read-out device of the invention in such a way that it supplies illumination to and thereby serves as the primary light source for a single message character bar segment. The "on/off" states of lamp 29 are governed by a switching circuit (not shown) embodied in printed circuit boards 35 and 37. In addition, it is a desirable feature of the invention that, in order to insure that the light from lamp 29 is directed exclusively to a particular opening in the light receiving surface of the message character display device without "spill-over" to adjacent openings, a system of light-insulators or shields consisting of appropriately spaced partitions or baffles perpendicular to the light-receiving surface is disposed between the light receiving surface and the array of primary light sources (lamps).

The foregoing specification and accompanying drawings describe the present invention in a preferred form. However, it will be understood that modifications and changes can be made without departing from the scope of the invention which is defined in the following claims.

I claim:

1. A visual message character display device comprising, in combination:
   (a) a light guide support member having
      (i) a light receiving surface with a plurality of openings and
      (ii) a visual message character display surface separate and spaced apart from the light receiving surface and having a plurality of bar-shaped openings arranged to provide arrays of a plurality of bar segments of predetermined visual message characters; and
   (b) a plurality of groups of light guiding optic fibers disposed within the space between the light receiving and visual message character display surfaces of the light guide support member, each light guiding optic fiber having a light admitting end and light emitting end, said device being further characterized in that the light admitting ends of the fibers of each group of light guiding optic fibers are bundled together in one opening in and terminate at the light receiving surface thereby defining and occupying essentially the entire surface area of said opening, the light emitting ends of the fibers of each group of light guiding optic fibers are bundled together in one opening in and terminate at the visual message character display surface thereby defining and occupying essentially the entire surface area of a visual message character bar segment, and the space between the light receiving surface and the visual message character display surface containing the groups of light guiding optic fibers is filled with a potting compound whereby the message character display device has a solid block configuration.

2. A message character display device according to claim 1 wherein:
   the light receiving and visual message character display surfaces are planar and essentially parallel to one another;
   the openings in the light receiving surface are essentially circular and uniformly spaced apart from one another on said surface;
   the light guiding optic fibers within each group thereof are of equal and constant cross-sectional area; and
   the area defined on the light receiving surface by the light admitting ends of the fibers of each group of light guiding optic fibers being essentially equal to the area defined on the visual message character display surface by the light emitting ends of the fibers of said group.

3. A message character display device according to claim 2 wherein the light admitting ends and light emitting ends of the fibers of each group of light guiding optic fibers are bundled together in substantially hexagonal-shaped closest-packing configuration.

4. A visual message character display device according to claim 1 wherein said device comprises additionally a plurality of primary light sources disposed in illuminating relationship with the light admitting ends of the groups of light guiding optic fibers, each light source having two unequal length terminal straight pins, and the primary light sources being mounted onto two separately spaced plane printed circuit boards wherein the shorter terminal straight pin of each light source is inserted into and makes electrical contact with a lead socket mounted on one printed circuit board and the longer terminal pin is inserted into and makes electrical contact with a lead socket mounted on the second printed circuit board, the longer terminal pin passing through the first circuit board without making electrical contact therewith.

5. A message character display device according to claim 4 wherein the primary light sources are sub-miniature incandescent lamps.

* * * * *

UNITED STATES PATENT AND TRADEMARK OFFICE
CERTIFICATE OF CORRECTION

PATENT NO. : 4,121,206

DATED : October 17, 1978

INVENTOR(S) : Paul R. LeMire

It is certified that error appears in the above-identified patent and that said Letters Patent are hereby corrected as shown below:

Column 3, line 20, "of" (third occurrence) should read -- or -- .

Column 5, line 5, "A" should read -- As -- .

Signed and Sealed this

Sixth Day of February 1979

[SEAL]

Attest:

RUTH C. MASON
*Attesting Officer*

DONALD W. BANNER
*Commissioner of Patents and Trademarks*